(12) United States Patent
Lai (10) Patent No.: US 8,910,135 B2
(45) Date of Patent: Dec. 9, 2014

(54) STRUCTURE LAYOUT OPTIMIZATIONS

(75) Inventor: Michael Lai, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 496 days.

(21) Appl. No.: 13/217,045

(22) Filed: Aug. 24, 2011

(65) Prior Publication Data

US 2012/0110561 A1 May 3, 2012

Related U.S. Application Data

(60) Provisional application No. 61/409,451, filed on Nov. 2, 2010.

(51) Int. Cl.
*G06F 9/45* (2006.01)

(52) U.S. Cl.
CPC .................................... *G06F 8/4442* (2013.01)
USPC .......................................... 717/159; 717/152

(58) Field of Classification Search
USPC .......................................................... 717/159
See application file for complete search history.

(56) References Cited

U.S. PATENT DOCUMENTS

| | | | | |
|---|---|---|---|---|
| 5,537,573 | A * | 7/1996 | Ware et al. | 711/137 |
| 6,330,556 | B1 * | 12/2001 | Chilimbi et al. | 1/1 |
| 2004/0098713 | A1 * | 5/2004 | Ogawa et al. | 717/160 |
| 2006/0095751 | A1 * | 5/2006 | Bybell et al. | 712/241 |
| 2009/0199169 | A1 * | 8/2009 | Lin | 717/159 |
| 2011/0047534 | A1 | 2/2011 | Ye et al. | |

OTHER PUBLICATIONS

Jin Lin and Pen-Chung Yew. 2010. A compiler framework for general memory layout optimizations targeting structures. In Proceedings of the 2010 Workshop on Interaction between Compilers and Computer Architecture (Interact-14). ACM, New York, NY, USA, Article 5 , 8 pages. DOI=10.1145/1739025.1739033.*

M. Hagog and C. Tice. "Cache aware data layout reorganization and optimization in GCC" 2005 in GCC Summit Proceedings, obtained on Dec. 11, 2013 from <ols.fedoraproject.org/GCC/Reprints-2005/hagog-Reprint.pdf>.*

Chakrabarti, Gautam and Chow, Fred, "Structure Layout Optimizations in the Open64 Compiler: Design, Implementation and Measurements," Proceedings of the Open64 Workshop, International Symposium on Code Generation and Optimization, Boston, 2008, 11 pages.

Hagog, M. and Tice, C., "Cache Aware Data Layout Reorganization Optimization in GCC," Proceedings of the GCC Developers Summit, Jun. 22-24, 2005, pp. 69-92.

Hundt, R., et al., "Practical Structure Layout Optimization and Advice," Proceedings of the International Symposium on Code Generation and Optimization, New York, 2006, 12 pages.

Troung, Dan N. et al., "Improving Cache Behavior of Dynamically Allocated Data Structures," Proceedings of the International Conference on Parallel Architectures and Compilation Techniques, Washington D.C., 1998, 8 pages.

Wolf, Michael E. and Lam, Monica S., "A Data Locality Optimizing Algorithm," Proceedings of the ACM SIGPLAN Conference on Programming Language and Implementation, Toronto, 1991, 15 pages.

* cited by examiner

*Primary Examiner* — James D Rutten (74) *Attorney, Agent, or Firm* — Abel Law Group, LLP (57) ABSTRACT

More effective compiler optimizations provide improved cache utilization. The compiler optimizations include a structure layout optimization that leaves the physical layout of the structure fields intact and instead changes the access order to these fields. The compiler optimizations apply to arrays using array remappings analogous to structure layout optimizations in which the array is considered as a structure and the physical layout of the array remains intact and instead the access order to the array changes.

20 Claims, 6 Drawing Sheets

```
struct {
  int field_1;
  int field_2;
  ...
  int hot_field;
  ...
  int field_m;
} array[n];

and for (i = 0; i < n; i++)
  array[i].hot_field = ...
```

FIG. 1

```
struct original {
  int hot_field_1;
  int cold_field_1;
  int hot_field_2;
};
```
201

```
struct parent {      struct child {
  int hot_field_1;     int cold_field_1;
  int hot_field_2;   };
  struct child *p;
};
```
203

FIG. 2

```
a[0].field_1
a[0].field_2
a[0].field_3
a[1].field_1
a[1].field_2
a[1].field_3
...
```
301

```
a[0].field_1
a[1].field_1
...
a[0].field_2
a[1].field_2
...
a[0].field_3
a[1].field_3
```
303

```
a[0]         = value of some array[0].field_1  ⎫
a[1]         = value of some array[0].field_2  ⎪
...                                            ⎬ iteration 0
a[m-1]       = value of some array[0].field_m  ⎭
a[m]         = value of some array[1].field_1  ⎫
a[m+1]       = value of some array[1].field_2  ⎪
...                                            ⎬ iteration 1
a[2*m-1]     = value of some array[1].field_m  ⎭
...
a[(n-1)*m]   = value of some array[n-1].field_1  ⎫
a[(n-1)*m+1] = value of some array[n-1].field_2  ⎪
...                                              ⎬ iteration n-1
a[n*m-1]     = value of some array[n-1].field_m  ⎭
```

Overhead optimized

AMD system

| | speed (1-copy) run | rate (12-copy) run |
|---|---|---|
| 462.libquantum (structure peeling) | +6.35% | +43.43% |
| 429.mcf (instance interleaving) | +2.43% | +38.38% |
| 470.lbm (array remapping) | -16.35% (degradation) | +138.55% |

Intel system

| | speed (1-copy) run | rate (4-copy) run |
|---|---|---|
| 462.libquantum (structure peeling) | +7.01% | +24.30% |
| 429.mcf (instance interleaving) | -6.04% (degradation) | +34.62% |
| 470.lbm (array remapping) | -23.28% (degradation) | +119.51% |

Overhead not optimized

AMD system

| | speed (1-copy) run | rate (12-copy) run |
|---|---|---|
| 462.libquantum (structure peeling) | N/A | N/A |
| 429.mcf (instance interleaving) | -22.57% (degradation) | +18.70% |
| 470.lbm (array remapping) | -56.62% (degradation) | +83.71% |

Intel system

| | speed (1-copy) run | rate (4-copy) run |
|---|---|---|
| 462.libquantum (structure peeling) | N/A | N/A |
| 429.mcf (instance interleaving) | -32.01% (degradation) | +3.22% |
| 470.lbm (array remapping) | -59.11% (degradation) | +103.64% |

FIG. 11

STRUCTURE LAYOUT OPTIMIZATIONS

CROSS-REFERENCE TO RELATED APPLICATION(S)

This application claims benefit of U.S. Provisional Application No. 61/409,451, filed Nov. 2, 2010, entitled "Structure Instance Interleaving and Array Remapping Optimizations in the Open64 Compiler," naming inventor Michael Lai, which application is incorporated by reference herein.

BACKGROUND

1. Field of the Invention

This invention relates to computing systems and more particularly to addressing poor cache utilization by applying optimizations to program code.

2. Description of the Related Art

Performance of computing systems depends on both hardware and software. For example, the speed of the processor (e.g., number of instructions executed per second), number of cores, cache size, and other hardware related aspects of the computing system affect performance. Software efficiency in performing a particular task also impacts performance. Often, the interaction of hardware and software can affect performance. One aspect where software and hardware interact is in accesses to cache memory. Cache memory stores copies of data that are otherwise stored in main memory. Cache memory is much smaller than main memory, but stores those locations that are being frequently used by the processor. Thus, cache memory allows the processor to access those frequently accessed locations more quickly than if the processor had to go to main memory.

Data for cache memory is typically retrieved in cache lines of, e.g., 64 bytes of data at a time. However, not all of the 64 bytes may actually be needed. As entries in the cache become stale from non-use, they may be replaced by other memory locations that are currently being used by the processor. When bytes that are not needed are retrieved from main memory and stored in the cache, poor cache utilization can occur.

Figure 1:
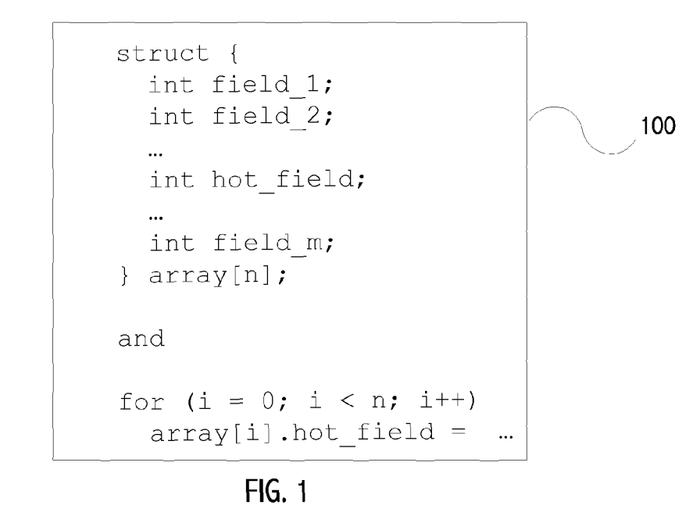
FIG. 1 illustrates a structure and why poor cache utilization can be associated with structures.

For example, when an application spends a lot of its execution time accessing only certain (not all) fields of structures, poor utilization of the data cache can frequently occur. A structure is a software construct having multiple fields, which can be of different types. An example would be a structure in which the fields of the structure represent information related to a person, such as name, age, address, and favorite websites. Poor cache utilization associated with structures can be understood by referring to the code segment shown in FIG. 1, where hot_field represents a field in a structure that is needed by the processor, but other fields in the structure, e.g., field_1 and field_2, are not needed. The poor cache utilization comes from the fact that the cache line that contains array[i]. hot_field will likely contain many other fields of the structure array[i], such as field_1 and field_2, which will be brought into the cache, along with hot_field, but unlike hot_field, these other fields will eventually be evicted from the cache unused. For some applications, that can severely degrade execution time performance.

Figure 2:
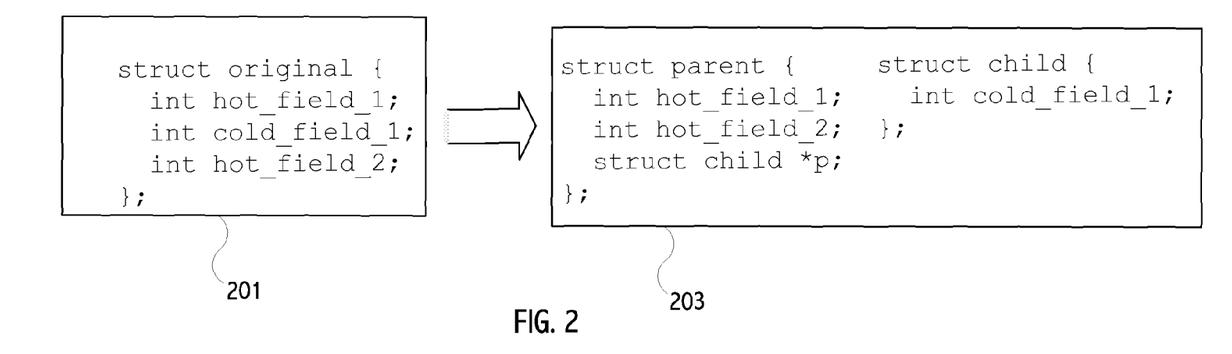
FIG. 2 illustrates a structure splitting compiler optimization that breaks up the original structure into multiple substructures.

To address this poor data cache utilization problem, compilers have applied a variety of structure layout optimizations. Compilers are used to take programs written in a high level language such as C, C++, or Fortran, and the like, and translate the high level code to machine level code that is suitable for execution on a processor. Compilers may translate the high level code to an intermediate representation and then to machine code suitable for a particular instruction set architecture. Currently, compiler structure layout optimizations include "structure splitting," which breaks up the original structure into multiple sub-structures, and places new pointers in the new parent structure as a way to access the new child structures. A common application of that optimization is to divide up the hot/cold fields as shown in FIG. 2 with the hot_fields together and the cold field separated as a new pointer in the parent field to a child structure. Thus, the structure 201 becomes the structure 203 with the hot and cold fields separated.

Figure 3:
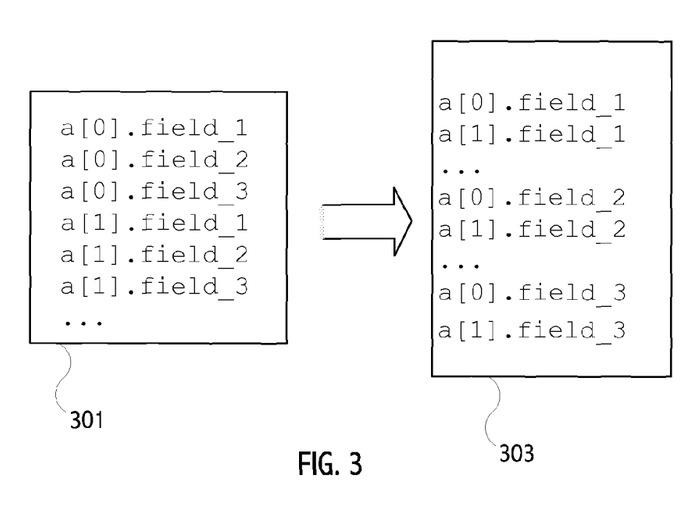
FIG. 3 illustrates a structure field reordering optimization that reorders the fields inside the structure by grouping frequently accessed fields together.

"Structure peeling" is similar to structure splitting, with the only exception that no new pointers are placed in the parent structure; hence, accesses to the child structures are made explicitly and directly through the new child structures. "Structure field reordering" reorders the fields inside the structure in a way the compiler deems beneficial, most often by grouping frequently accessed fields close together. "Structure instance interleaving" groups together corresponding fields in various instances of the structure. For example, in an array of structures, each array element, a[i], itself a structure, is an instance. To interleave all these instances is to group their corresponding fields together. As shown in code segment 301 in FIG. 3, each array element a[0], a[1] is a structure that includes field_1, field_2, and field_3. To interleave all these instances is to group their corresponding fields together. Segment 303 illustrates the transformation that occurs to interleave the fields together. Field_1 of all the instances are grouped together. Similarly, field_2 of all the instances are grouped together as are field_3 of all the instances and so on.

While these cache optimizations have improved cache utilization in certain cases, these optimizations result in changing the structures physically. Further improvements in compiler optimizations to improve data cache utilization associated with structures is desirable.

SUMMARY OF EMBODIMENTS OF THE INVENTION

Accordingly, embodiments provide new approaches to structure layout optimizations. In an embodiment a method is provided for compiling source code. The method includes identifying a structure array, having a plurality of array elements, each array element being a structure with a plurality of fields. Structure instance interleaving is performed on the structure array by permuting access to the fields of the structure and leaving the physical layout of the structure intact. The compiled code includes the permuted access to fields of the structure.

In another embodiment a method is provided for applying structure instance interleaving to an array. The method includes identifying an array and remapping the array to change access order to the array using a remapping permutation. The compiled code includes the permuted access to the array. The array remapping permutation is determined according to a stride, group size, and array size of the array.

In another embodiment a computer readable storage medium is provided that has computer-executable instructions that in response to execution, cause a computer system to perform compiler operations that include identifying a structure array having a plurality of array elements, each array element being a structure with a plurality of fields. Structure instance interleaving is performed on the structure array by permuting access to the fields of the structure in the array elements generating compiled code including the permuted access.

In another embodiment a computer readable storage medium is provided that has computer-executable instructions that in response to execution, cause a computer system to perform compiler operations identifying an array and remapping the array to change access order to the array using a remapping permutation; and generating compiled code including the permuted access to the array.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Currently, prior art compiler structure layout optimizations involve changing the physical layout of the structure of interest, for example, structure splitting, structure peeling, structure field reordering, and structure instance interleaving, etc. Prior art compiler structure layout optimizations require the compiler to carefully monitor the usages of the structures and decide if the advantage of performing the optimization is worth the overhead of the new layout. As a result, all such existing structure layout optimizations tend to be conservative in their decision making, leading to many overlooked opportunities. However, it is possible to circumvent the need to physically change the layout of the structures (i.e. leaving the original structures intact and undisturbed), but instead accomplish the same beneficial effect by changing the access order of the structure fields.

Thus, unlike traditional compiler structure layout optimizations (structure splitting, structure peeling, structure field reordering, structure instance interleaving), the approaches described herein do not physically re-layout the fields of the structures of interest, but instead manipulate the accesses to those fields to achieve the same effect of the re-layout. The idea of structure re-layout can also be applied to certain arrays that suffer the same data locality problems as structures.

Figure 4:
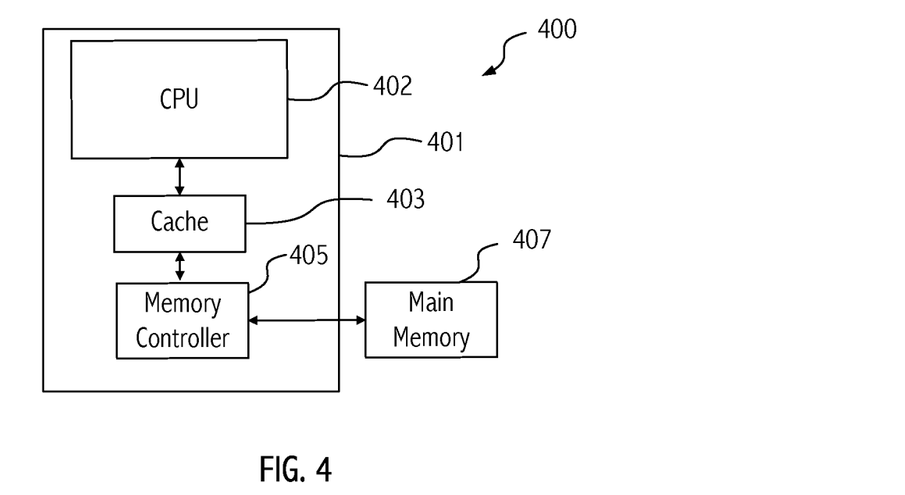
FIG. 4 illustrates an exemplary computer system that can execute the compiler software described herein, or execute optimized code generated by the compiler software described herein.

A simplified high level diagram of an exemplary computer system on which a compiler can run or on which the compiled code from a compiler can be run, is shown in FIG. 4. Computer system 400 includes a processor 401 that includes a CPU 402 and cache memory 403. The processor may have multiple cores and one or more graphical processing units, as well as multiple levels of cache memory, but a single CPU and a single cache memory is shown for ease of illustration. A memory controller 405 controls access to the main memory 407. When a program executing on CPU 402 requires memory access for data that is not in the cache 403, an access to main memory is required that takes many more CPU cycles than if the memory locations were already stored in cache. Thus, improving cache utilization through more effective compiler optimizations, and reducing poor cache utilization, increases program execution speed.

The compiler, as software, may be stored in non-volatile memory of the computer system, e.g., the hard drives, and loaded into computer memory (RAM) for execution. The compiler may also be stored in various other kinds of tangible non-transitory storage media including disk, tape, or other magnetic, optical, or electronic storage medium. The compiled code generated by the compiler may initially be stored in volatile memory of the computer system 400 and then transferred to other forms of storage. The compiled code that is generated by the compiler may also be executed on a computer system such as the one shown in FIG. 4.

As stated above, the approaches described herein do not physically re-layout the fields of the structures of interest, but instead manipulate the accesses to those fields to achieve the same effect of the re-layout. Consider the following analogy. When a two-dimensional array exhibits very poor data cache utilization (for example, the data is laid out in column major order (ala Fortran), but accessed in row major order (ala C/C++)), one can physically re-layout the data, thus affecting "all" future accesses (beneficial or otherwise), or one can more simply perform a loop interchange optimization to accomplish the same effect. Embodiments described herein provide the "loop interchange equivalent" of applying such optimizations to structures and arrays. However, unlike the "loop interchange" counterpart, the formulas involved in the transformation are more complex, but very beneficial nonetheless as shown in performance results described below.

Loop optimizations, such as loop interchange and loop blocking, change the access order to array elements in such a way that data cache misses are minimized. The physical layout of the array elements is not modified. In contrast, structure layout optimizations, such as structure splitting and structure peeling, actually re-layout the fields of the structures in such a way that frequently accessed fields are grouped together. The original access order to these fields remains unchanged.

New approaches to optimizations are described herein that can be considered a hybrid of loop optimizations and structure layout optimizations. The new approaches to structure layout optimization described herein leave the physical layout of the structure fields intact and instead change the access order to these fields. The nature of the structure layout optimization approaches described herein enables inclusion of arrays into the domain of structure layout optimizations, which is not known to be performed by other compilers. Thus, in embodiments, array remapping optimizations are provided allowing arrays to be included in the domain of structure layout optimizations. As with the structure instance interleaving optimization, in array remapping, the physical layout of the structure fields, or the array elements that are analogous to structure fields, remain intact, and instead the access order to these fields change.

The compiler can be more aggressive in its decision-making by using the new optimization approaches described herein, and apply the new approaches described herein to more cases, including ones overlooked by prior art optimizations. As an example, using an embodiment described herein, the benchmark program 429.mcf in the SPEC CPU2006 benchmark integer suite improved by 38.4%, when the prior art optimizations had rendered the case "unoptimizable." As another example, under an embodiment described herein, the benchmark program 470.lbm in the SPEC CPU2006 benchmark floating point suite improved by 138.6%, when prior art optimizations would not even consider such a case as suitable for optimization.

Even though the physical layout of the structure fields is not changed, both the new approaches to structure instance interleaving and array remapping optimizations are nevertheless global in nature, as they change the order of all the accesses to the structures or arrays of interest. Consequently, these optimizations are implemented where the compiler enjoys a whole program view during the compilation process, e.g., in the IPA (interprocedural analysis and optimization) component of the Open64 compiler.

Figure 5:
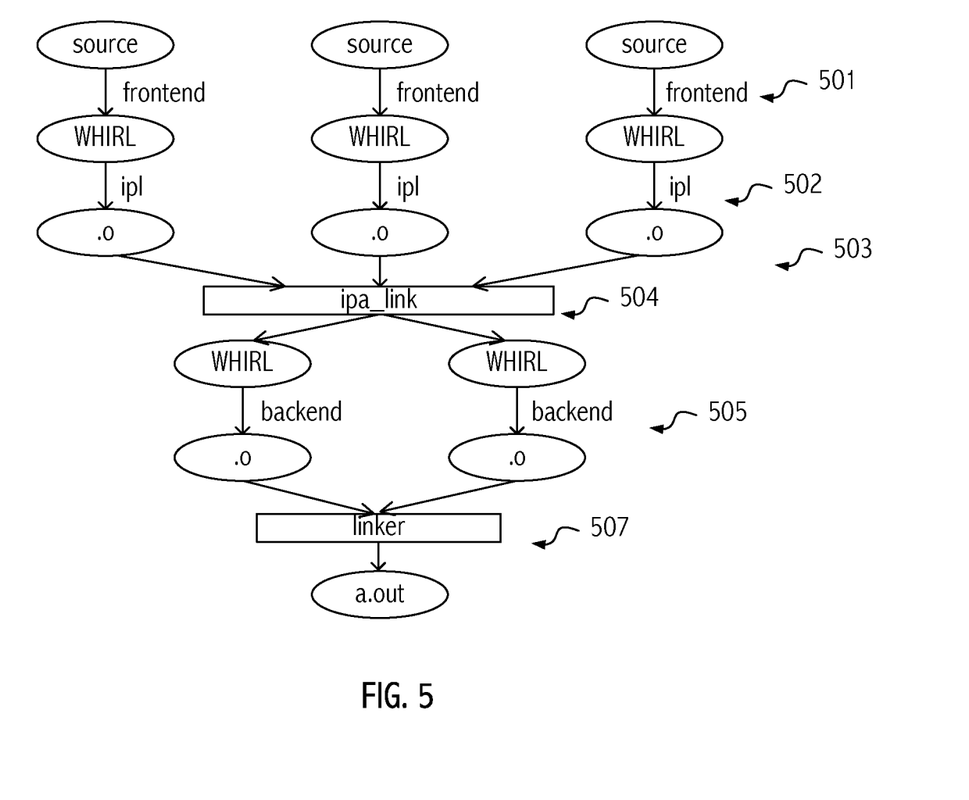
FIG. 5 is a high level block diagram of the major components of the Open64 compiler.

FIG. 5 illustrates the major components of the Open64 compiler including the frontend 501, backend 505, linker 507, and IPA (interprocedural analysis and optimization) 503. The IPA component can be further divided into the ipl 502 and ipa_link 504 sub-components. All of these components use a common intermediate representation, called WHIRL, for communication and processing.

The frontend component 501 reads in each source file to be compiled and generates a corresponding WHIRL file for it. IPA compilation is actually a 2-pass process. During pass 1, the local phase of interprocedural analysis (ipl) component processes the WHIRL generated by the frontend for each source file and generates a corresponding .o file. In pass 2, the ipa_link component gathers all these .o files and performs analyses and optimizations on them collectively. Whole program type optimizations, such as data layout optimization, dead function elimination and IPA constant propagation, are performed in this pass. One or more WHIRL files are generated by ipa_link. The backend component generates a .o file for each input WHIRL file. Finally, the linker component combines all these .o files into an executable file a.out.

The backend component is further comprised of many sub-components, the major ones being LNO (loop nest optimizer), WOPT (global optimizer), and CG (optimizing code generator). LNO performs many traditional loop transformations such as loop blocking, loop interchange and loop fusion. Other important optimizations performed by LNO include software prefetching and vectorization. WOPT builds control flow graphs, carries out data flow analyses, and performs many traditional scalar optimizations such as constant folding and partial redundancy elimination. The main task of CG is to emit instructions for the target machine, although along the way it applies many machine dependent optimizations such as address optimization as well as other peephole optimizations.

Assume a typical structure:

```
struct {
    int field_1;
    int field_2;
```

-continued

```
    ...
    int field_m;
};
```

Assuming the above structure exhibits poor data cache utilization, traditionally the compiler can manage to peel off some of the hot fields from the original structure. Each hot field will become its own structure (having just one field), effectively creating an array for each of the hot fields. For this, the compiler incurs the overhead of keeping track of these new hot fields arrays. Moreover, since storage for these arrays are usually allocated through malloc( ) a memory allocation function, there may not remain any spatial locality between one hot field array and another.

Instead, an optimization according to an embodiment of this invention optimizes this structure by conceptually grouping all the hot fields together by accessing them together. A major advantage of the optimizations described herein is the ease of implementation because there is not much bookkeeping for the compiler to do since the layout of the structure or array of interest is not changed. However, the formulas involved in these new approaches are slightly more complex and may incur some overhead, which can be further reduced/eliminated by traditional scalar optimizations. There may be a price for the ease of implementation in the form of overhead incurred in the generated code, as it is now likely that every access to the structure or array will involve some additional remapping code.

Figure 6:
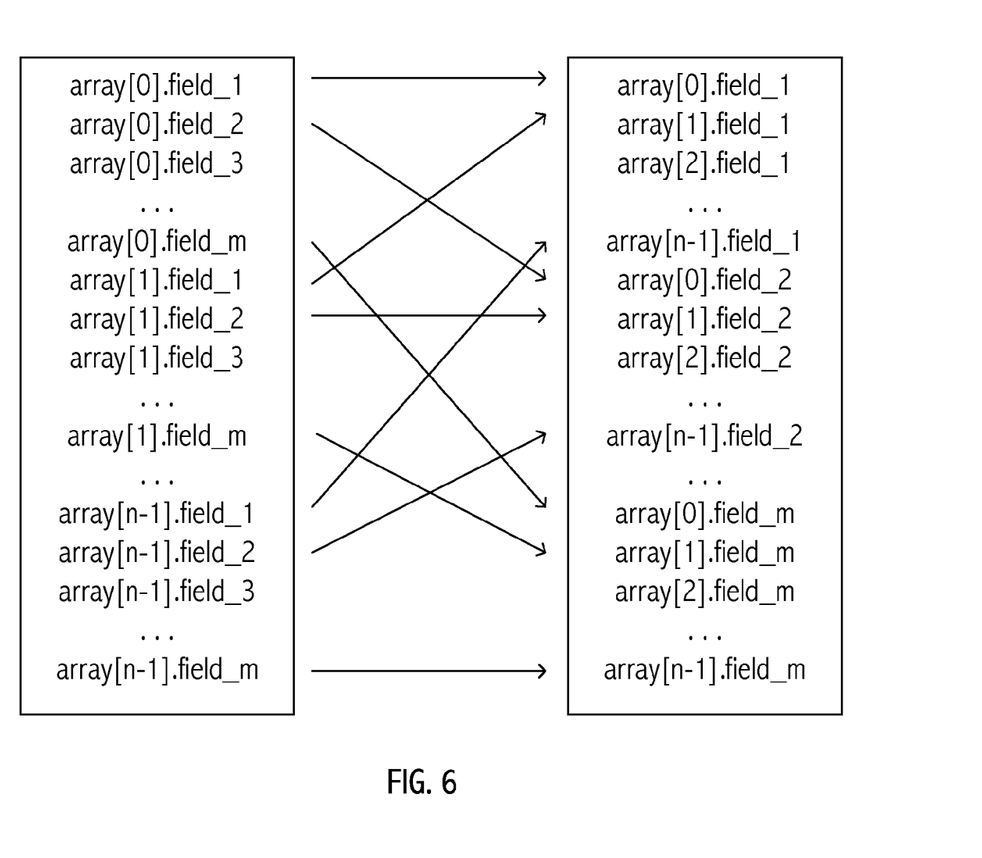
FIG. 6 illustrates a transformation of a data structure by an optimization according to an embodiment of the invention providing a blueprint for the compiler to follow when accessing a particular field belonging to a particular instance.

FIG. 6 illustrates the data structure for the exemplary structure above, and after it has been transformed by an optimization, according to an embodiment of the invention. FIG. 6 illustrates a blueprint for the compiler to follow when accessing a particular field belonging to a particular instance. For example, array[1].field_1, originally occurring in the (m+1)-th order on the left-hand side, has been (conceptually only, not physically) moved to the second order on the right-hand side. That is the way the compiler will perform structure layout optimization for the entire structure and for all the instances.

Note that the total allocated storage before and after the optimization remains unchanged. Only the accesses to the structure fields have been permuted. The approach is analogous to performing structure peeling on all the fields of the structure (for example, peeling off field_1, giving it its own array, then peeling off field_2, giving it its own array, and so on), but without having to actually create any new structure or allocate storage for any new array. The physical layout of the fields remains unchanged; only the accesses to these fields have been reordered.

Figure 7:
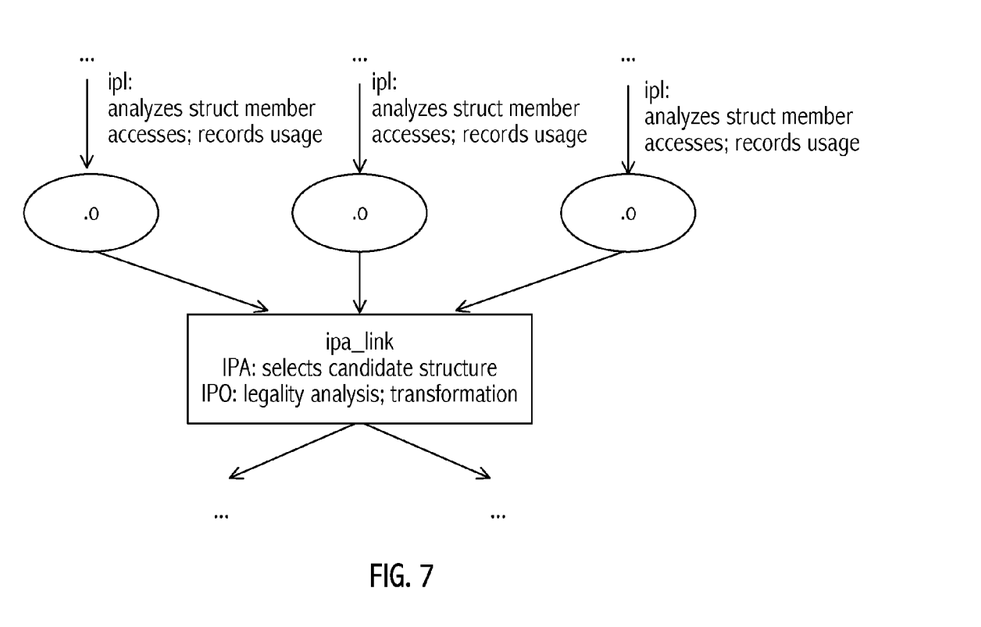
FIG. 7 illustrates a flow diagram of an implementation of structure instance interleaving according to an embodiment of the invention.

Referring to FIG. 7, illustrated is a flow diagram of an implementation of structure instance interleaving according to an embodiment of the invention. During the ipl compilation of each program source file, the compiler analyzes the access patterns of all the structure fields encountered and records their usage statistics. Of particular interest is the number of distinct fields of each structure referenced in every frequently executed loop. That analysis can take advantage of execution profile feedback data, if available, but even in its absence, it applies heuristics to estimate usage frequencies.

After all the functions have been compiled by ipl, the compiler forms a global picture of how frequently the fields of all the structures are accessed. The compiler processes all these candidate structures and their usage statistics and assigns a profitability probability to each structure. An ideal candidate structure, with a profitability probability of 100%, is one with m fields, each of which appears in its own hot loop.

Among all the candidate structures, the compiler selects one with the largest profitability probability as the structure that it deems will most likely benefit the most from structure instance interleaving. This candidate structure is then passed to IPO (interprocedural optimization) by setting a bit in the structure type (TY) of the structure.

The first of two important steps performed by IPO for structure instance interleaving is legality analysis. Here the compiler goes over the WHIRL to make sure that it is safe to perform the optimization for the candidate structure. In the Open64 compiler, legality analysis for structure instance interleaving builds on top of the same phase carried out by structure splitting or structure peeling, which includes checking for type casting, address taken, escaped types, etc.

After the candidate structure passes the legality analysis step, IPO transforms the WHIRL to reflect the effect of the structure instance interleaving optimization. In the code transformation, internal pointers $ptr\_0, ptr\_1, \ldots, ptr\_m$ are created to keep track of the m locations $array[0].field\_1$, $array[0].field\_2, \ldots, array[0].field\_m$, respectively. The most common rewriting of the compiler internal representation involves changing $array[i].field\_j$ to $ptr\_j[i]$. For example, referring to FIG. 6, in such a rewriting $array[1].field\_2$ becomes $ptr\_2[1]$.

When the expression array[i] is available to the compiler, the code transformation is straight forward, but this may not always be the case. Sometimes the program assigns array[i] to some structure_ptr and thereafter accesses the field of the structure array[i] simply through structure_ptr. So, instead of $array[i].field\_j$, the compiler only sees $structure\_ptr\text{->}field\_j$. In such cases the compiler has to rediscover "i" from structure_ptr:

$i=(structure\_ptr-ptr\_0)/$size of structure, which means that $array[i].field\_j$ (or $structure\_ptr\text{->}field\_j$) will be rewritten as $ptr\_j[(structure\_ptr-ptr\_0)/$size of structure].

For example, with reference to FIG. 6, assume there is a structure_ptr that points to $array[n-1].field\_1$. By plugging in the values for structure_ptr, $ptr\_0$ and m, in the equation above, the value of i can be recovered. For example, if $n-1=3$, $m=4$, then structure_ptr=13, $ptr\_0=1$ and i will be recovered as 3.

The additional overhead (especially with the cost of the divide operation) is the price for this relatively simple implementation of structure instance interleaving. It can be seen from the above that structures with sizes in bytes equaling a power of two are preferred. Thus, embodiments of the invention include structure padding as part of the structure instance interleaving optimization to include dummy fields in the structure to make the structure size a power of two.

Figure 8:
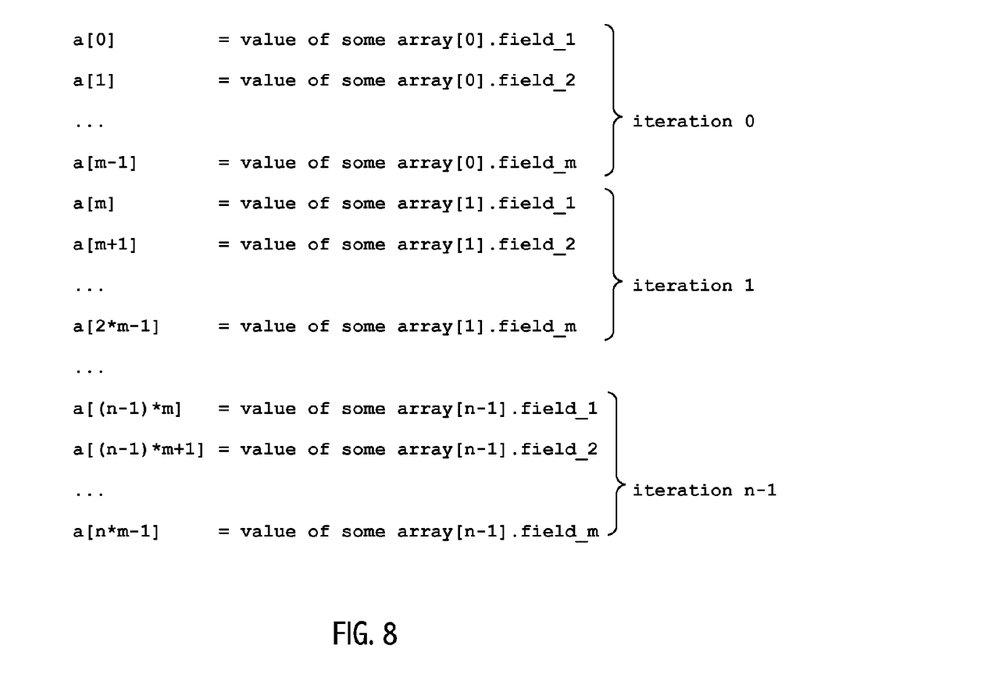
FIG. 8 illustrates a one-dimensional array coded in a manner such that the one-dimensional array is seen to be analogous to an "array" of structures.

The idea of "structure" layout optimization does not have to be limited only to structures. It can be applied to constructs that behave like structures. Consider the one-dimensional array shown in FIG. 8. When coded as shown in FIG. 8, the one-dimensional array "a" is seen to be analogous to "array" of structures shown in FIG. 6, and can suffer from poor cache utilization. That is, consider the array "a" to have multiple instances of a structure, with each instance having m fields. That is, each iteration is analogous to an instance of the structure. Since an array carries no inherent field structure, there is nothing to relayout. Still, a "conceptual" relayout optimization can be applied. Viewed from the perspective of structure layout optimization, FIG. 9 illustrates the necessary transformation.

Figure 9:
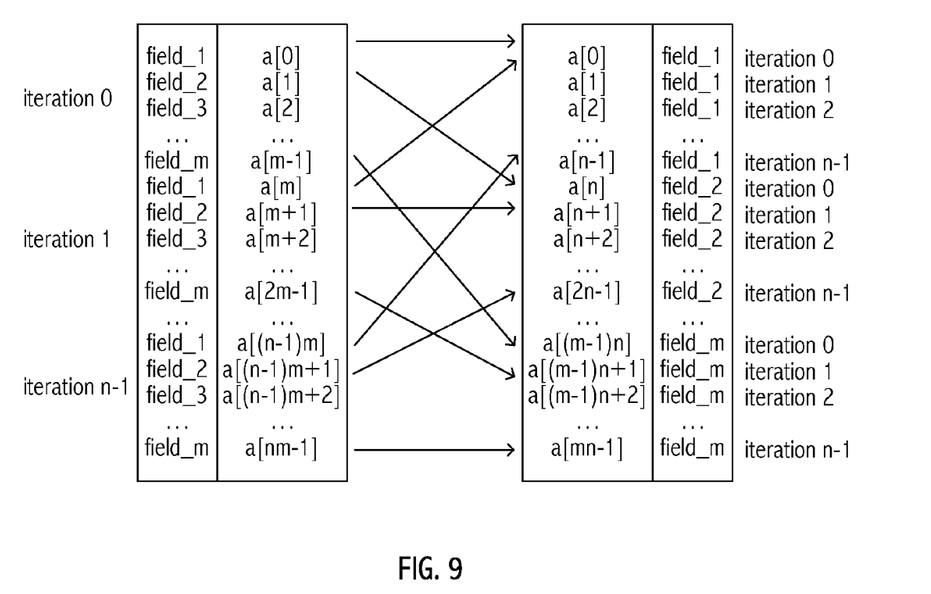
FIG. 9 illustrates an exemplary remapping of the array.

FIG. 9 illustrates that the effect of this "structure" layout optimization is to map a[0] to a[0], a[1] to a[n], a[2] to a[2*n], . . . , and a[n*m-1] to a [m*n-1]. Recall that a bijective (one-to-one and onto) function that maps the set of integers {0, 1, 2, . . . , n*m-1} onto itself is called a permutation. The exercise of conceptual "structure" re-layout of a one-dimensional array is to find a permutation that will solve the poor cache utilization problem. This optimization is referred to herein as array remapping and this optimization is completely analogous to the structure instance interleaving optimization discussed above.

Figure 10:
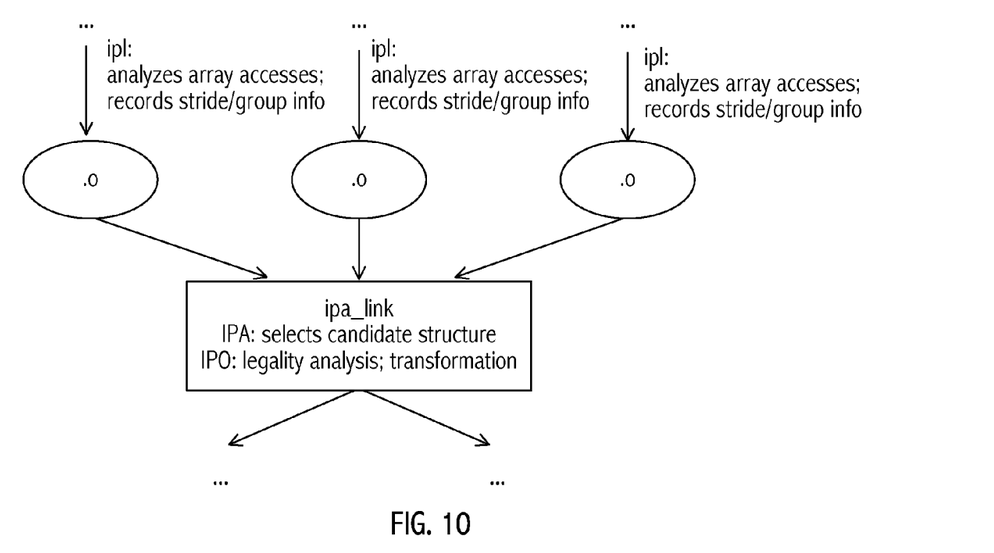
FIG. 10 illustrates an exemplary flow of the compiler to implement the array remapping according to an embodiment of the invention.

FIG. 10 illustrates a high level diagram of array remapping according to an embodiment of the invention. Similar to structure instance interleaving, array remapping is performed in the IPA component of the compiler, where the compiler has information on the whole program. However, unlike structure instance interleaving, where an explicit structure is defined, the first step in array remapping is to decide if this optimization is even applicable. That means that the compiler has to apply some algorithms and heuristics to discover if there are arrays that behave like structures and suffer poor data cache utilization at the same time. This is done during the profitability analysis stage. After that, the compiler has to make sure that it has enough visibility into the entire program to make sure that it can remap all the occurrences of the candidate array. Finally, the compiler has to construct the permutation for the remapping.

During the ipl compilation of each program source file, the compiler analyzes all the array accesses and records those that exhibit poor cache utilization. Of particular interest are the arrays whose accesses in frequently executed loops behave as follows: (1) for each particular array access, the stride between consecutive loop iterations remains constant; (2) this constant stride is large enough so that the consecutive array accesses will not fit into a cache line of the machine; and (3) within each loop iteration, the array accesses collectively form a group, with each member of this group possessing properties (1) and (2) above, and that all the constant strides have the same value. Arrays with such behaviors are marked as remapping candidates by setting a bit in their Symbol Table (ST) structures. The ST lists all the symbols listed in the compiled program.

After all the functions have been compiled by ipl, the compiler forms a global picture of how these array remapping candidates are used in the entire program, and selects those that it deems most beneficial for remapping. Usually these final candidates all show an overwhelming presence of cache-unfriendly accesses in the entire program. Since remapping an array is a global decision, it does not make sense to remap an array if, say, it behaves poorly in only half of the frequently executed loops in the program, while behaving acceptably in the other half. For each of these final array remapping candidates, the compiler records the stride, group size, and array size associated with it. That information will be used to construct the permutation in the code transformation phase.

As long as the remapping of an array is done consistently throughout the entire program, that is, if every occurrence of a[i] becomes a[alpha(i)], where alpha is the remapping permutation, correctness will not be an issue. Hence, legality analysis involves making sure that all such occurrences are visible to the compiler. Potential problems are aliasing the candidate array to something else via the taking of its address or passing it as an argument. Array remapping will also be disabled if problematic accesses of the array elements are detected, such as taking the address of an array element, etc. This legality check is performed in the IPO component.

For each array remapping candidate identified by the compiler in the ipl phase that passes the legality analysis step, IPO transforms the WHIRL to reflect the effect of the array remapping.

For code transformation, first the array remapping permutation alpha is constructed. The compiler first records the stride, group size, and array size associated with the candidate array of interest. Define m to be the group size and n to be the number of such groups. Then alpha can be constructed to be:

$$alpha(i)=(i\ \%\ m)*n+(i/m),$$

where % is a modulo operation, * is a multiplication and /is a divide operation. That calculation will be accurate if the array [0] is the first element of the array; otherwise, additional bookkeeping will be necessary. For example, when an array does not begin with a[0], say, it begins with a[10], the "i" in the formula "alpha(i)=(i % m)*n+(i/m), changes to reflect to the correct "offset" (distance from the index to the beginning of the array, which in this case is 10 array elements). The most common rewriting of the compiler internal representation involves changing a[i] to a[alpha(i)]. This is completely analogous to performing structure layout optimization on the array "a" as if it were an array of structures each of which contains m fields. It may be beneficial to implement additional optimizations to reduce (or eliminate) the % and divide operations as part of array remapping. Such optimizations can take place, for example, in other traditional parts of the compiler that already implement such optimizations.

Figure 11:
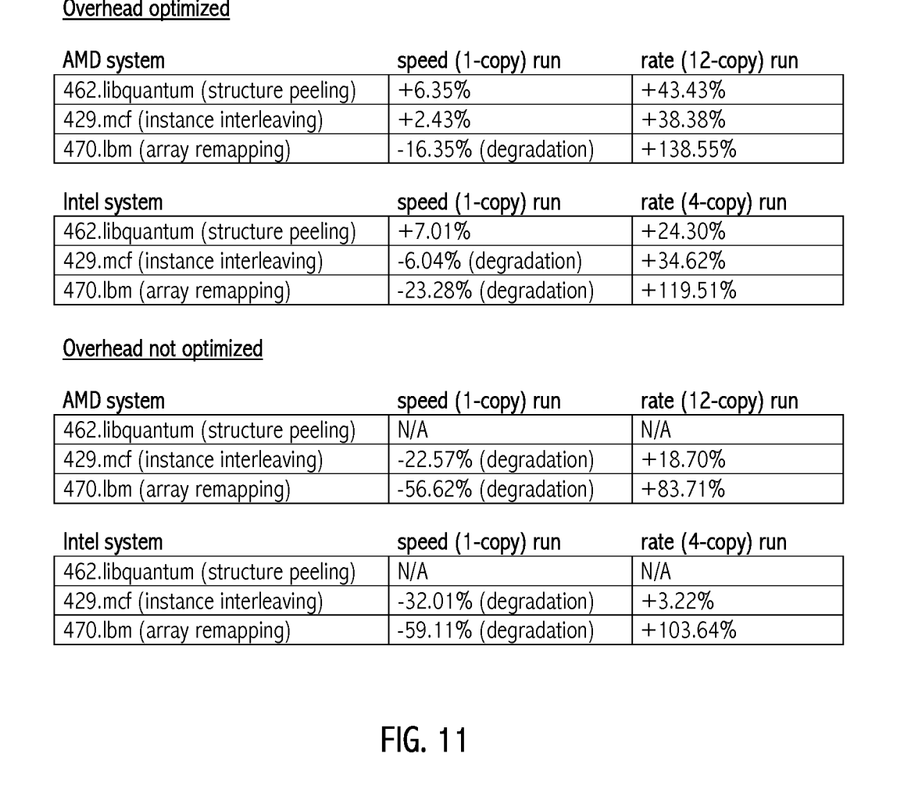
FIG. 11 illustrates exemplary results of embodiments of the invention.

Referring to FIG. 11, the performance results of the structure instance interleaving and array remapping optimizations are shown for the benchmark programs in the SPEC CPU2006 suite where they show the most impact. The results of structure peeling are shown for the purposes of completeness and comparison.

The "AMD system" used is an AMD six-core Opteron machine with two processors, each processor containing six 2.6 GHz cores. The system has 32 GB of 800 MHz memory. The "Intel system" used is an Intel quad-core Core i7 machine with two processors, each processor containing four 2.93 GHz. The system has 12 GB of 1333 MHz memory. Results of both speed (1-copy) and rate runs are shown in FIG. 11. For the speed run, just one copy of the benchmark was run. For the rate runs, more than one copy of the benchmark are run simultaneously. Due to a configuration issue, only 4-copy rate runs were performed on the Intel system, whereas 12-copy rate runs were done on the AMD system (one copy of the benchmark running for each core). All the benchmarks were compiled with the x86 Open64 4.2.3 Compiler using peak flags.

For the overhead optimized runs, the % and divide operations were reduced/eliminated by the compiler, and structure padding was used. As shown in FIG. 11, for the runs where the overhead was not optimized, the improvements were not as good. The processor speed is very important for performance for the speed runs and poor cache utilization may affect performance only marginally. Where more than one copy is run in the rate runs, poor cache utilization can hurt performance a lot, and so the optimizations described herein help improve the performance significantly as shown.

The results in FIG. 11 show that for some applications, the improvements provided by the structure layout optimizations described herein can be impressive. That is true for both the AMD and Intel systems. As mentioned, one advantage of the structure instance interleaving and array remapping optimizations is the ease of implementation. The actual structure or array involved in the optimization is not modified, only the accesses to them are permuted. The associated disadvantage of this approach is that these modified accesses may incur some performance overhead. From the results shown in FIG. 11, it can be seen that this overhead, if not reduced or eliminated by additional optimizations, can be rather substantial. Sometimes the additional overhead (even after best efforts to optimize the overhead away) will completely negate any potential gains that we get from the optimizations themselves. This is especially true when performing speed (1-copy) runs, when (exclusive) access to the cache may not be as contentious to begin with. That suggests these structure instance interleaving and array remapping optimizations may need to be invoked judiciously.

In an embodiment, the existing structure layout optimizations described in the background section take precedence over the new approach to structure instance interleaving. That is, a structure is not considered for instance interleaving unless it is already rejected by the existing structure layout optimizations. However, in other embodiments, the various profitability heuristics of all these structure layout optimizations are combined to allow the compiler to make better decisions. While the embodiments described herein describe structure instance interleaving optimization as applying to one structure, and the array remapping optimization to one-dimensional arrays as candidates, other embodiments relax such restrictions and apply to multiple structures and multi-dimensional arrays.

The description of the invention set forth herein is illustrative, and is not intended to limit the scope of the invention as set forth in the following claims. For example, while the invention has been described in various embodiments in the context of the Open64 compiler, one of skill in the art will appreciate that the teachings herein can be utilized for other compilers. Variations and modifications of the embodiments disclosed herein may be made based on the description set forth herein, without departing from the scope and spirit of the invention as set forth in the following claims.

What is claimed is:

1. A method for compiling source code comprising:
   in a compiler, identifying a structure array, having a plurality of array elements, each array element being a structure with a plurality of fields; and
   performing structure instance interleaving on the structure array by permuting access to the fields of the structure without altering a physical layout of the structure array; and
   generating compiled code including the permuted access to fields of the structure;
   wherein generating the compiled code including the permuted access includes,
   creating internal pointers in the compiler to track m locations of m fields in each of the structures, where m is an integer corresponding to a number of fields in the structure, by rewriting array[i].field_j, where j represents a jth field of an ith array element of the structure array, to ptr_j[i], where ptr_j[i] is one of the internal pointers pointing to the jth field of the ith array element.

2. The method as recited in claim 1 further comprising:
   determining i to be equal to ((structure_ptr−ptr_0/size of structure), where structure_ptr is a pointer assigned to array[i] and accesses are made to fields of the structure array[i] through structure_ptr.

3. The method as recited in claim 1 further comprising padding a structure to increase a size in bytes of the structure to a power of two for those structures having an initial structure size other than a power of two.

4. The method as recited in claim 1 further comprising performing structure instance interleaving only after declining to optimize the structure array using one or more other structure optimization techniques.

5. The method as recited in claim 1 further comprising performing a profitability analysis to determine the structure array.

6. The method for compiling source code as recited in claim 1 further comprising:
identifying a second array having no inherent field structure;
remapping the second array to change access order to the second array using a remapping permutation; and
generating compiled code including the permuted access to the second array.

7. The method as recited in claim 6 wherein the second array is a one-dimensional array.

8. The method as recited in claim 6 further comprising determining the second array remapping permutation according to a stride, group size, and array size of the second array.

9. The method as recited in claim 8 further comprising remapping the second array according to a permutation alpha, where alpha[i]=(i % m)*n+(i/m), where i is an array index, m is a group size, n is a number of groups, % is a modulo operation, and * is a multiplication operation.

10. The method as recited in claim 8 further comprising changing the access order to all accesses to the second array in the compiled code.

11. The method as recited in claim 8 wherein identifying the second array comprises determining for each particular array access, that the stride between consecutive loop iterations remains constant and the stride is large enough so that consecutive array accesses do not fit into a cache line.

12. A computer readable storage medium comprising computer-executable instructions that in response to execution, cause a computer system to perform compiler operations comprising:
identifying an array having a plurality of array elements, each array element being a structure with a plurality of fields; and
performing structure instance interleaving on the array by permuting access to the fields of the structure in the array elements; and
generating compiled code including the permuted access;
wherein generating the compiled code including the permuted access includes,
creating internal pointers to track m locations of m fields in the structure, where m is an integer corresponding to the plurality of fields, by rewriting array[i].field_j, where j represents a jth field of an ith array element of the structure array, to ptr_j[i], where ptr_j[i] is one of the internal pointers pointing to the jth field of the ith array element.

13. The computer readable storage medium as recited in claim 12 wherein the operations further comprise:
determining i to be equal to ((structure_ptr−ptr_0/size of structure), where structure_ptr is a pointer assigned to array[i] and accesses are made to fields of the structure array[i] through structure_ptr.

14. The computer readable storage medium as recited in claim 12 wherein the operations further comprise:
padding a structure to increase a number of fields of the structure to render the size in bytes of the structure to be a power of two for those structures having an initial structure size other than a power of two.

15. The computer readable storage medium as recited in claim 12 wherein the operations further comprise:
implementing structure instance interleaving only after one or more other structure optimization techniques are discarded.

16. The computer readable storage medium as recited in claim 12, wherein the operations further comprise:
identifying a second array having no inherent field structure;
remapping the second array to change access order to the second array using a remapping permutation; and
generating compiled code including the permuted access to the second array.

17. The computer readable storage medium as recited in claim 16 wherein the operations further comprise:
determining the second array remapping permutation according to a stride, group size, and array size of the second array.

18. The computer readable storage medium as recited in claim 17 wherein the operations further comprise:
remapping the array according to a permutation alpha, where alpha[i]=(i % m)*n+(i/m) where i is an array index, m is a group size, n is a number of groups, % is a modulo operation, and * is a multiplication operation.

19. The computer readable storage medium as recited in claim 17 wherein the operations further comprise changing the access order to all accesses to the second array in the compiled code.

20. The computer readable storage medium as recited in claim 17 wherein identifying the second array comprises determining for each particular array access, that the stride between consecutive loop iterations remains constant and the stride is large enough so that consecutive array accesses do not fit into a cache line.

* * * * *